US010679274B2

(12) United States Patent
Banerjee et al.

(10) Patent No.: US 10,679,274 B2
(45) Date of Patent: Jun. 9, 2020

(54) METHOD AND SYSTEM FOR DATA PROCESSING TO RECOMMEND LIST OF PHYSICAL STORES IN REAL-TIME

(71) Applicant: Conduent Business Services, LLC, Dallas, TX (US)

(72) Inventors: Joydeep Banerjee, Tempe, AZ (US); Gurulingesh Raravi, Bangalore (IN); Manoj Gupta, Bangalore (IN); Sindhu Kiranmai Ernala, Secunderabad (IN); Shruti Kunde, Mumbai (IN); Koustuv Dasgupta, Bangalore (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 640 days.

(21) Appl. No.: 15/267,467

(22) Filed: Sep. 16, 2016

(65) Prior Publication Data

US 2018/0082348 A1   Mar. 22, 2018

(51) Int. Cl.
*G06Q 30/06* (2012.01)
*G06Q 30/02* (2012.01)
*G06Q 10/08* (2012.01)

(52) U.S. Cl.
CPC ... *G06Q 30/0631* (2013.01); *G06Q 10/08355* (2013.01); *G06Q 30/02* (2013.01); *G06Q 30/0261* (2013.01)

(58) Field of Classification Search
CPC .................................................. G06Q 30/0631
See application file for complete search history.

(56) References Cited

U.S. PATENT DOCUMENTS 6,266,649 B1 * 7/2001 Linden ............. G06Q 10/08345
705/14.51
7,720,720 B1 * 5/2010 Sharma ............. G06Q 30/0631
705/26.7

(Continued)

OTHER PUBLICATIONS

Yin, H.; Sun, Y.; Cui, B.; Hu, Z.; and Chen, L. 2013. Lcars: A location-content-aware recommender system. In *Proceedings of the 19th ACM SIGKDD International Conference on Knowledge Discovery and Data Mining*, KDD '13, 221-229.

(Continued)

*Primary Examiner* — Florian M Zeender
*Assistant Examiner* — Whitney Poffenbarger
(74) *Attorney, Agent, or Firm* — Jones Robb, PLLC

(57) ABSTRACT

The disclosed embodiments illustrate method and system for data processing to recommend a list of physical stores in real-time for user-specified products and/or services. The method includes receiving a request, that comprises one or more products and/or services and one or more user-defined parameters, from a user-computing device. The method further includes aggregating information associated with the received request, profile information of a user, real-time traffic information, and geographical locations of a plurality of physical stores. Further, the method includes generating a recommendation list based on the aggregated information and a similarity score of the user for each of the one or more products and/or services. The method further includes transmitting the generated recommendation list to the user-computing device. The user may select a recommendation from the recommendation list for purchasing and/or availing products and/or services based on the selected recommendation.

20 Claims, 5 Drawing Sheets

(56) References Cited

U.S. PATENT DOCUMENTS

| | | | | |
|---|---|---|---|---|
| 8,166,016 B2* | 4/2012 | Higgins | ............. | G06F 16/9535 707/706 |
| 2008/0270398 A1* | 10/2008 | Landau | ................. | G06Q 30/02 |
| 2009/0248494 A1* | 10/2009 | Hueter | ................. | G06Q 10/00 705/7.29 |
| 2011/0010307 A1* | 1/2011 | Bates | .................... | G06Q 30/02 705/347 |
| 2011/0282821 A1* | 11/2011 | Levy | ................. | G06Q 30/0631 706/47 |
| 2014/0032678 A1* | 1/2014 | Koukoumidis | .... | G06Q 30/0255 709/205 |
| 2014/0100991 A1* | 4/2014 | Lenahan | ............ | G06Q 30/0625 705/26.62 |
| 2014/0172627 A1* | 6/2014 | Levy | ................. | G06Q 30/0631 705/26.7 |
| 2015/0039461 A1* | 2/2015 | Gadre | ................ | G06Q 30/0639 705/26.7 |
| 2015/0039462 A1* | 2/2015 | Shastry | ............. | G06Q 30/0633 705/26.7 |
| 2015/0269224 A1* | 9/2015 | Kundu | ................ | G06F 16/2455 707/718 |
| 2015/0278917 A1* | 10/2015 | Stoll | ................. | G06Q 30/0631 705/26.7 |
| 2015/0278919 A1* | 10/2015 | Stoll | ................. | G06Q 30/0631 705/26.7 |

OTHER PUBLICATIONS

Pisinger, D. 1995. A minimal algorithm for the multiplechoice knapsack problem. *European Journal of Operational Research* 83(2):394-410.

Eppstein, D. 1999. Finding the k shortest paths. *SIAM J. Comput.* 28(2):652-673.

Bao, J.; Zheng, Y.; and Mokbel, M. F. 2012. Locationbased and preference-aware recommendation using sparse geo-social networking data. In *Proceedings of the 20th International Conference on Advances in Geographic Information Systems*, SIGSPATIAL '12, 199-208.

* cited by examiner

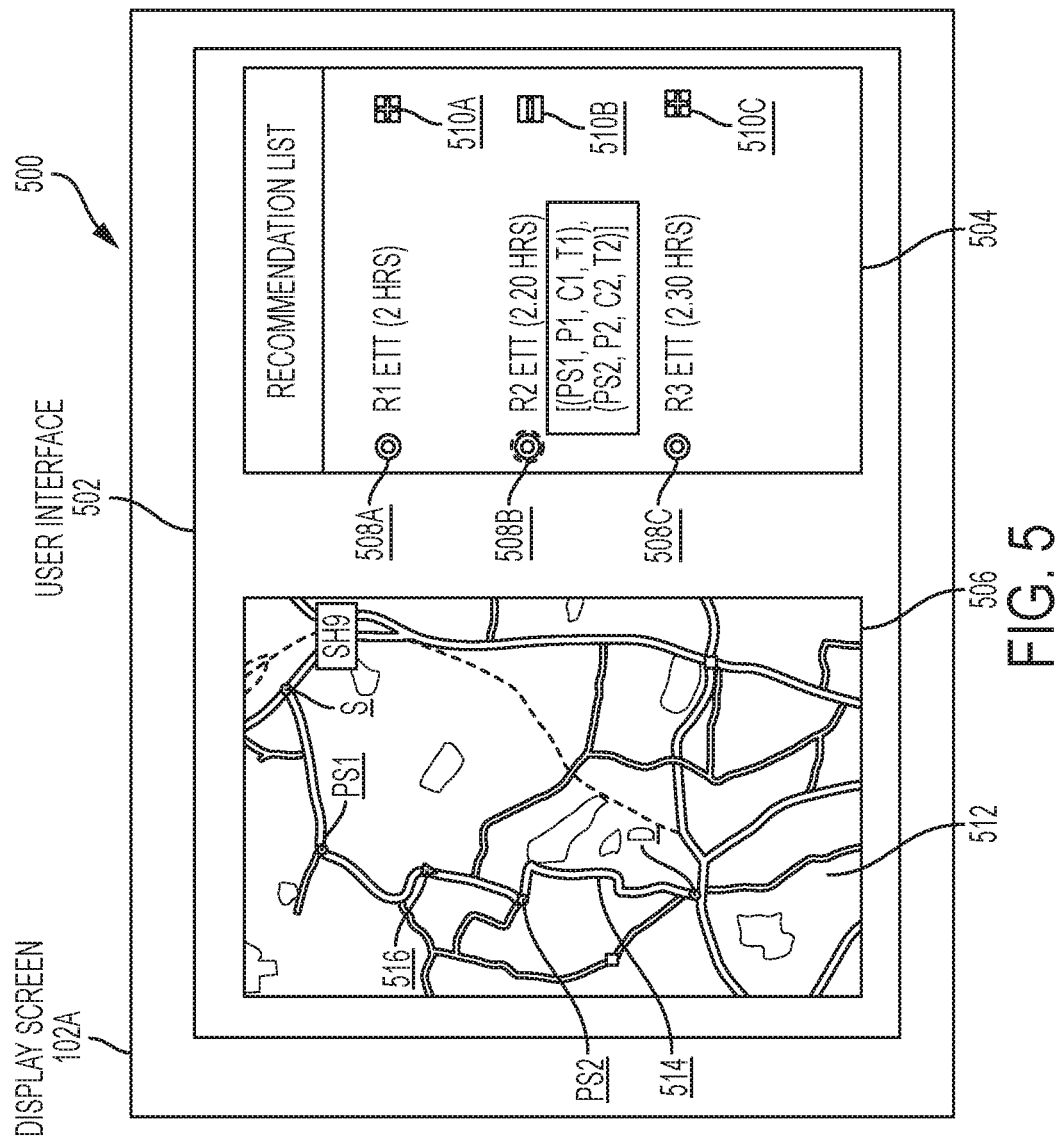

METHOD AND SYSTEM FOR DATA PROCESSING TO RECOMMEND LIST OF PHYSICAL STORES IN REAL-TIME

TECHNICAL FIELD

The presently disclosed embodiments are related, in general, to data processing. More particularly, the presently disclosed embodiments are related to methods and systems for data processing to recommend a list of physical stores in real-time for one or more user-specified products and/or services.

BACKGROUND

In modern days, various advancements in the field of information technology have provided numerous tools and applications, such as recommendation systems, to customers that intend to buy products and/or services via online stores and/or physical stores. Such recommendation systems cater to a section of customers who still prefer shopping at physical stores that provide physical infrastructure for showcasing various products provided by different vendors.

Various techniques, such as text messaging, have been devised to implement such recommendation systems so that a single recommendation is provided to the customers regarding products, offers, and deals at such physical stores. However, in certain scenarios, the text messages are spam and may not cater to the needs of the customers. Further, such text messages may not be related to the personas of the customers. Furthermore, hectic lifestyles of the customers and massive expansion of available products and stores have tremendously increased the struggle of the customers in deciding what to buy, in which stores to buy, and what route to take to reach such physical stores. Therefore a dynamic and comprehensive recommendation system is required that matches the needs of the customers by taking into account their shopping personas and various constraints.

Further limitations and disadvantages of conventional and traditional approaches will become apparent to a person having ordinary skill in the art, through comparison of described systems with some aspects of the present disclosure, as set forth in the remainder of the present application and with reference to the drawings

SUMMARY

According to embodiments illustrated herein, there is provided a method for data processing to recommend a list of physical stores in real-time for user-specified products and/or services. The method includes receiving, by one or more transceivers in a computing device, a request from a user-computing device associated with a user, over a communication network, wherein the request comprises one or more products and/or services and one or more user-defined parameters. The method further includes aggregating, by a data processor in the computing device, information associated with the received request, profile information of the user, real-time traffic information, and geographical locations of a plurality of physical stores. The method further includes generating, by a recommendation engine in the computing device, a recommendation list based on the aggregated information and a similarity score of the user for each of the one or more products and/or services. Further, the recommendation in the generated recommendation list comprises a set of products and/or services from the one or more products and/or services, a route encompassing a set of physical stores from the plurality of physical stores associated with the set of products and/or services. The method further includes transmitting, by the one or more transceivers in the computing device, the generated recommendation list to the user-computing device. The recommendation is selected from the recommendation list by the user for purchasing and/or availing products and/or services based on the selected recommendation.

According to embodiments illustrated herein, there is provided a system for data processing to recommend a list of physical stores in real-time for user-specified products and/or services. The system includes one or more transceivers in a computing device configured to receive a request from a user-computing device associated with a user, over a communication network. The request further comprises one or more products and/or services and one or more user-defined parameters. A data processor in the computing device is configured to aggregate information associated with the received request, profile information of the user, real-time traffic information, and geographical locations of a plurality of physical stores. A recommendation engine in the computing device is configured to generate a recommendation list based on the aggregated information and a similarity score of the user for each of the one or more products and/or services. Further, a recommendation in the generated recommendation list comprises a set of products and/or services from the one or more products and/or services, a route encompassing a set of physical stores from the plurality of physical stores associated with the set of products and/or services. The one or more transceivers in the computing device are further configured to transmit the generated recommendation list to the user-computing device. Further, the recommendation is selected from the recommendation list by the user for purchasing and/or availing products and/or services based on the selected recommendation.

According to embodiments illustrated herein, there is provided a computer program product for use with a computer, the computer program product comprising a non-transitory computer readable medium, wherein the non-transitory computer readable medium stores a computer program code for data processing to recommend a list of physical stores in real-time for user-specified products and/or services. The computer program code is executable by one or more transceivers to receive a request from a user-computing device associated with a user, over a communication network. Further, the request comprises one or more products and/or services and one or more user-defined parameters. The computer program code is further executable by one or more processors to aggregate information associated with the received request, profile information of the user, real-time traffic information, and geographical locations of a plurality of physical stores. The computer program code is further executable by one or more processors to generate a recommendation list based on the aggregated information and a similarity score of the user for each of the one or more products and/or services. Further, the recommendation in the generated recommendation list comprises a set of products and/or services from the one or more products and/or services, a route encompassing a set of physical stores from the plurality of physical stores associated with the set of products and/or services. The computer program code is further executable by one or more processors to transmit the generated recommendation list to the user-computing device. Further, the recommendation is selected from the recommendation list by the user for purchasing and/or availing products and/or services based on the selected recommendation.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which:

FIG. 5 illustrates an exemplary scenario for presenting a user-interface for displaying a recommendation list on a user-computing device based on a user request, in accordance with at least one embodiment.

DETAILED DESCRIPTION

Figure 1:
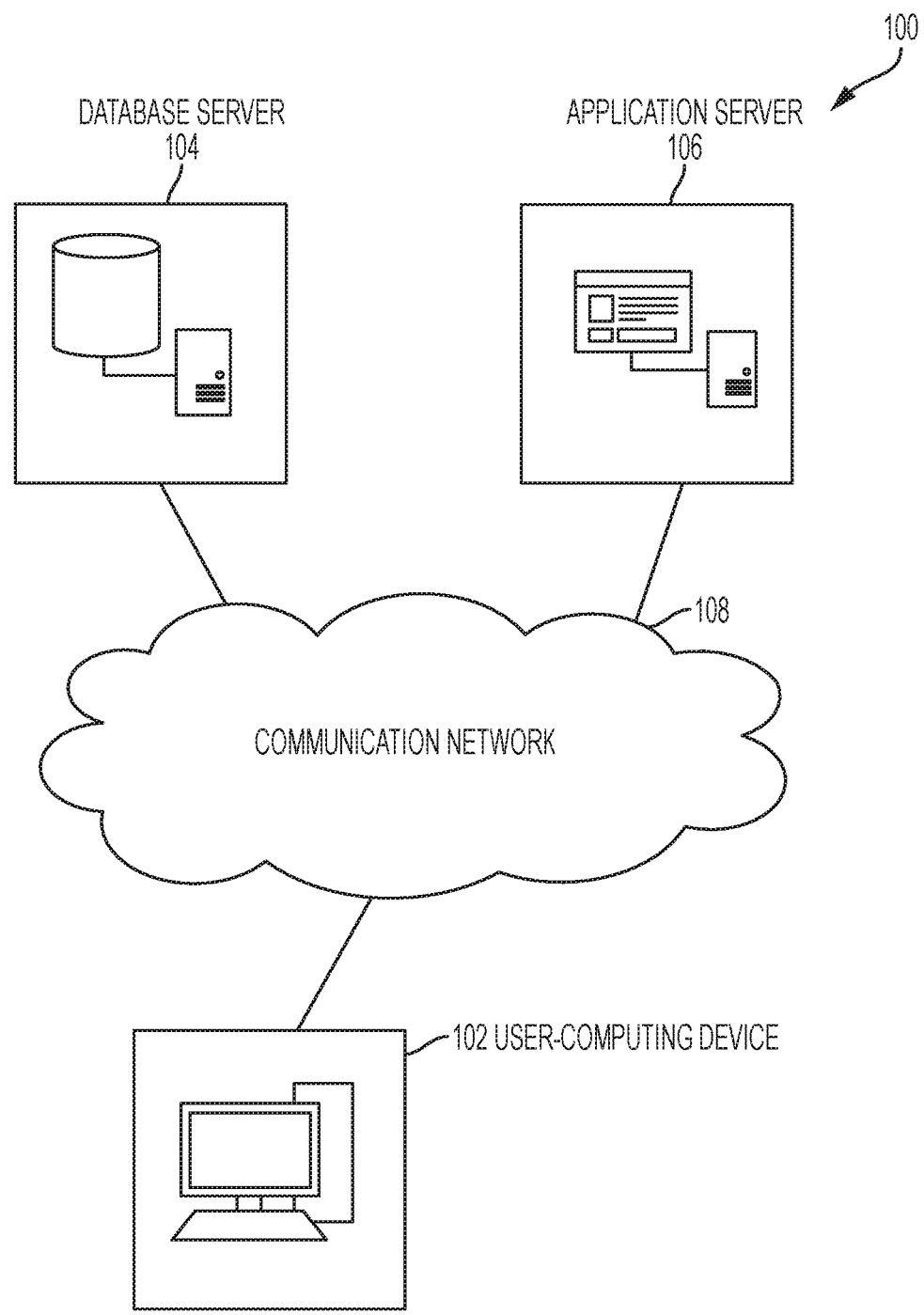
FIG. 1 is a block diagram of a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "recommendation" represents a suggestion that is provided to a user in response to a user request. The recommendation may either correspond to an optimal recommendation or a sub-optimal recommendation. The optimal recommendation meets the product and/or service requirement of the user completely, whereas the sub-optimal recommendation addresses the product and/or service requirement of the user partially. More than one recommendation, pertaining to a user request, may constitute a recommendation list. In an embodiment, the recommendation may comprise information pertaining to a route that encompasses physical stores where products and/or services requested by the user are available and cost of the requested products and/or services in the corresponding physical stores. Further, the recommendation may satisfy a time constraint and a budget constraint specified in the user request.

A "similarity score" refers to a score of a product and/or service, for a user, available in a physical store. In an embodiment, the similarity score of the product and/or service may be determined based on profile information of the user. Further, the similarity score may indicate an extent to which the product and/or service in a physical store is similar to a product and/or service requested by the user. For example, a user may request for a product "wooden board" of thickness "500 mm" and size "0.5 m×0.5 m." At the physical store, two types of wooden board may be available. The thickness and size of the first type of wooden board may be "500 mm" and "1 m×0.5 m," respectively. The thickness and size of the second type of wooden board may be "200 mm" and "1 m×0.5 m," respectively. In such a case, similarity score of the first type of wooden board may be higher than the second type of wooden board.

A "user profile" represents a profile associated with a user that includes one or more preferences of the user, a purchase history of the user for a plurality of products and/or services, demographic details, and lifestyle information of the user. In an embodiment, the user profile may correspond to a profile of the user on a social networking website.

A "route" refers to a way or course of passage traversed from a first geographical location to a second geographical location. The route further encompasses a set of physical stores, associated with a set of products and/or services, located on the way or course of passage between the first geographical location and the second geographical location. In an embodiment, the route may be the shortest route based on real-time traffic congestion and availability of one or more products and/or services in one or more physical stores.

"One or more user-defined parameters" refer to one or more constraints and or conditions a user may specify in a request. In an embodiment, the one or more user-defined parameters may include a time constraint, a budget constraint, a first geographical location of the user and a second geographical location of the user. In an embodiment, recommendations for the user request may be filtered or identified based on the one or more user-defined parameters.

A "first geographical location" corresponds to a source location from which the user may wish to start his/her travel to reach a destination location. In an embodiment, the first geographical location may correspond to a current location of the user. For example, if the user wants to travel from a location "A" to a location "B," then the location "A" corresponds to the first geographical location.

A "second geographical location" corresponds to a destination location that a user may wish to reach from a source location by following a route among one or more routes. For example, if the user wants to travel from location "A" to location "B," then location "B" corresponds to the second geographical location. In an embodiment, the second geographical location may correspond to a geographical location of a physical store.

A "budget constraint" refers to a limit associated with a maximum amount of money that may be spent by a user while shopping in one or more physical stores. In an embodiment, the budget constraint may represent one of the many parameters utilized to identify recommendations for a user request.

A "physical store" refers to a building or a part of the building where products and/or services are available to be purchased and/or availed. Examples of the physical stores may include, but are not limited to, shopping malls and retails stores.

A "first criteria" corresponds to a count of products and/or services in the set of products and/or services associated with each recommendation in the recommendation list. In an embodiment, the recommendations in the recommendation list may be ranked based on the first criteria. For example, in a first recommendation, a route may encompass the set of physical stores associated with "3" out of "5" products and/or services specified by the user. In a second recommendation, another route may encompass the set of physical stores associated with "5" out of "5" products and/or services specified by the user. In such a case, the second recommendation may be ranked higher in comparison to the first recommendation, based on the count of available products and/or services.

A "second criteria" corresponds to the similarity score associated with each of the product and/or service in the set of products and/or services corresponding to each recommendation. In an embodiment, the second criteria may correspond to a collective similarity score of the products and/or services in the set of products and/or services corresponding to each recommendation. In an embodiment, the recommendations in the recommendation list may be ranked based on the second criteria. For example, for a first recommendation, a similarity score associated with a product may be "0.98" and for a second recommendation, the similarity score associated with the product may be "0.78." In such a case, the first recommendation may be ranked higher in comparison to the second recommendation in the recommendation list due to a higher similarity score.

A "user-computing device" refers to a device (including one or more processors/microcontrollers and/or any other electronic components, or a device) or a system (that performs one or more operations according to one or more programming instructions/codes) associated with a user. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "user" refers to a buyer, who wants to access physical stores for buying and/or availing required products and/or services. In an embodiment, the user may provide a request for receiving one or more recommendations pertaining to the physical stores and routes encompassing the physical stores where the required products and/or services are available.

"Products and/or services" refer to items and/or facilities a user may want to purchase or avail. In an embodiment, products and/or services may be available on a plurality of physical stores. For example, a user may want to purchase groceries, a wrist watch, one or more home appliances, and/the like. In such a case, the groceries, the wrist watch, and the one or more home appliances may correspond to the products that may be purchased by the user. Further, the user may want to get hair spa done at a beauty salon. In such a case, hair-spa service provided by the beauty salon may correspond to the service that may be availed by the user.

FIG. 1 is a block diagram of a system environment 100, in which various embodiments can be implemented. The system environment 100 includes a user-computing device 102, a database server 104, an application server 106, and a communication network 108. Various devices in the system environment 100 may be interconnected over the communication network 108. FIG. 1 shows, for simplicity, one user-computing device, such as the user-computing device 102, one database server, such as the database server 104, and one application server, such as the application server 106. However, it will be apparent to a person having ordinary skill in the art that the disclosed embodiments may also be implemented using multiple user-computing devices, multiple database servers, and multiple application servers.

The user-computing device 102 may refer to a computing device (associated with a user) that may be communicatively coupled to the communication network 108. The user-computing device 102 may comprise one or more processors and one or more memory units. The one or more memory units may include computer readable codes and instructions that may be executable by the one or more processors to perform predetermined operations specified by the user. In an embodiment, the user-computing device 102 may have a global positioning sensor (GPS) installed within that may transmit navigation data pertaining to real-time location of the user-computing device 102 to the application server 106. In an embodiment, the user may utilize the user-computing device 102 to transmit a request for receiving one or more recommendations. In an embodiment, the request may comprise one or more products and/or services required by the user and one or more user-defined parameters. In an embodiment, the one or more user-defined parameters provided by the user may comprise, but are not limited to, a time constraint, a budget constraint, a first geographical location of the user, and a second geographical location of the user.

Further, in an embodiment, the user-computing device 102 may be configured to present a user-interface, received from the application server 106, to the user. The user interface may present a recommendation list pertaining to the user request. After receiving the recommendation list, the user may utilize the user-computing device 102 to select at least a recommendation from the recommendation list. In an embodiment, the user may further utilize the user-computing device 102 to provide a feedback, associated with the received recommendation list, to the application server 106.

The user-computing device 102 may be implemented as a variety of computing devices such as a desktop computer, a computer server, a laptop, a personal digital assistant (PDA), a tablet computer (e.g., iPad® or Samsung Galaxy® Tab), a mobile device, a smartphone, and the like.

The database server 104 may refer to a computing device that may be communicatively coupled to the communication network 108. In an embodiment, the database server 104 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 104 may be configured to store map data of a geographical area and profile information of a plurality of users. In an embodiment, the profile information of a user may comprise a purchase history for a plurality of products and/or services, demographic details of the user, and lifestyle information of the user. The purchase history may correspond to metadata associated with the plurality of products and/or services previously purchased by the user. The metadata may include, but is not limited to, a cost of the plurality of products and/or services, a brand associated with each of the plurality of products and/or services, an offer available on the plurality of products and/or services purchased and/or availed by the user. Further, the demographic details may comprise details pertaining to age, sex, address, and/or other such information related to the user. Further, the lifestyle information of the user may be associated with user's persona. For example, the user may be a luxuriant shopper or an infrequent shopper based on one or more features, such as brand consciousness, preference for stores types (e.g., exclusive stores for luxuriant shoppers), product popularity, media influence, preference for promotional schemes or sale seasons, associated with the plurality of products and/or services previously purchased by the user.

In an embodiment, the database server 104 may be further configured to store geographical locations of the plurality of physical stores in the geographical area. Further, the database server 104 may be further configured to store a product and/or service inventory associated with each physical store among the plurality of physical stores. The product and/or service inventory of a physical store may comprise information pertaining to cost of available products and/or services, a count of available products, a waiting time associated with a service, and/or latest promotional offers on available products and/or services. In an embodiment, the product and/or service inventory may be updated in real-time based on availability of products and/or services in the corresponding physical store. In an embodiment, the database server 104 may receive one or more queries from the application server 106 for the retrieval of the map data, the profile information of the user, and the product and/or service itineraries of the plurality of physical stores.

For querying the database server 104, one or more querying languages (such as, but not limited to, SQL, QUEL, and DMX) may be utilized. In an embodiment, the application server 106 may connect to the database server 104 using one or more protocols, such as, but not limited to, ODBC protocol and JDBC protocol. Further, the database server 104 may be realized through various technologies, such as, but not limited to, Microsoft® SQL server, Oracle, and My SQL.

The application server 106 may refer to a computing device or a software framework that may provide a generalized approach to create the application-server implementation. In an embodiment, the functionalities of the application server 106 may be dedicated to the efficient execution of procedures (such as, but not limited to, programs, routines, or scripts) stored in one or more memory units for supporting its applied applications. In an embodiment, the application server 106 may be communicatively coupled to the communication network 108.

In an embodiment, the application server 106 may be configured to receive the request from the user-computing device 102 to recommend a list of physical stores. In an embodiment, the application server 106 may act as a middleware for the user-computing device 102 to process the request for recommending the list of physical stores in real-time for the user-specified products and/or services to the user. In an embodiment, the application server 106 may present a web interface on the user-computing device 102 that may enable the user to select the first geographical location (or verify the first geographical location determined by the GPS) and the second geographical location.

After receiving the request, the application server 106 may be configured to query the database server 104 to retrieve the map data and the profile information of the user who transmitted the request. Further, the application server 106 may be configured to extract real-time traffic information from one or more tracking services known in the art. Thereafter, the application server 106 may be configured to aggregate information associated with the request, the profile information of the user, the real-time traffic information, and the geographical locations of the plurality of physical stores.

Thereafter, in an embodiment, the application server 106 may be configured to retrieve the product and/or service inventory of each of the plurality of physical stores. The application server 106 may utilize the product and/or service inventory of each of the plurality of physical stores to identify products and/or services that match the one or more products and/or services requested by the user. Thereafter, the application server 106 may be configured to compute similarity score of the user for each of the one or more products and/or services based on the profile information of the user. The similarity score may be further computed based on one or more feature values associated with the one or more products and/or services for one or more feature categories.

Thereafter, based on the computed similarity scores and the aggregated information, the application server 106 may be configured to generate the recommendation list. Further, a recommendation in the recommendation list may comprise a set of products and/or services from the one or more products and/or services, and a route encompassing a set of physical stores from the plurality of physical stores associated with the set of products and/or services. In an embodiment, the recommendation list may comprise a pre-determined count of recommendations. In other words, the application server 106 may be configured to identify "top-k" (where k corresponds to the pre-determined count) recommendations to constitute the recommendation list.

Further, in an embodiment, the application server 106 may be configured to rank the "top-k" recommendations in the recommendation list. In an embodiment, the application server 106 may be configured to rank the recommendations based on a first criteria and/or a second criteria. In an embodiment, the first criteria may correspond to a count of products and/or services in the set of products and/or services associated with each recommendation in the recommendation list. In an embodiment, the second criteria may correspond to the similarity score associated with each product and/or service in the set of products and/or services. Thereafter, the application server 106 may be configured to transmit the ranked recommendation list to the user-computing device 102. In an embodiment, the application server 106 may be configured to present a user-interface on the user-computing device 102 for displaying the ranked recommendation list to the user. An exemplary user-interface presented on the user-computing device 102 for displaying the ranked recommendation list to the user has been described later in FIG. 5.

Further, the application server 106 may be configured to receive a selection of a recommendation from the user-computing device 102. In an embodiment, the application server 106 may be configured to update the recommendation list in real-time based on the selection of the recommendation by the user. The selection may correspond to a feedback provided by the user.

The application server 106 may be realized through various types of application servers such as, but not limited to, a Java application server, a .NET framework application server, a Base4 application server, a PHP framework application server, or any other application server framework.

A person having ordinary skill in the art will understand that the scope of the disclosure is not limited to the database server 104 and the application server 106 as a separate entities. In an embodiment, the functionalities of the database server 104 and the application server 106 may be combined into a single server, without limiting the scope of the disclosure.

The communication network 108 may correspond to a communication medium through which the user-computing device 102, the database server 104, and the application server 106 may communicate with each other. Such a communication may be performed, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, Enhanced Data for Global Evolution (EDGE), infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
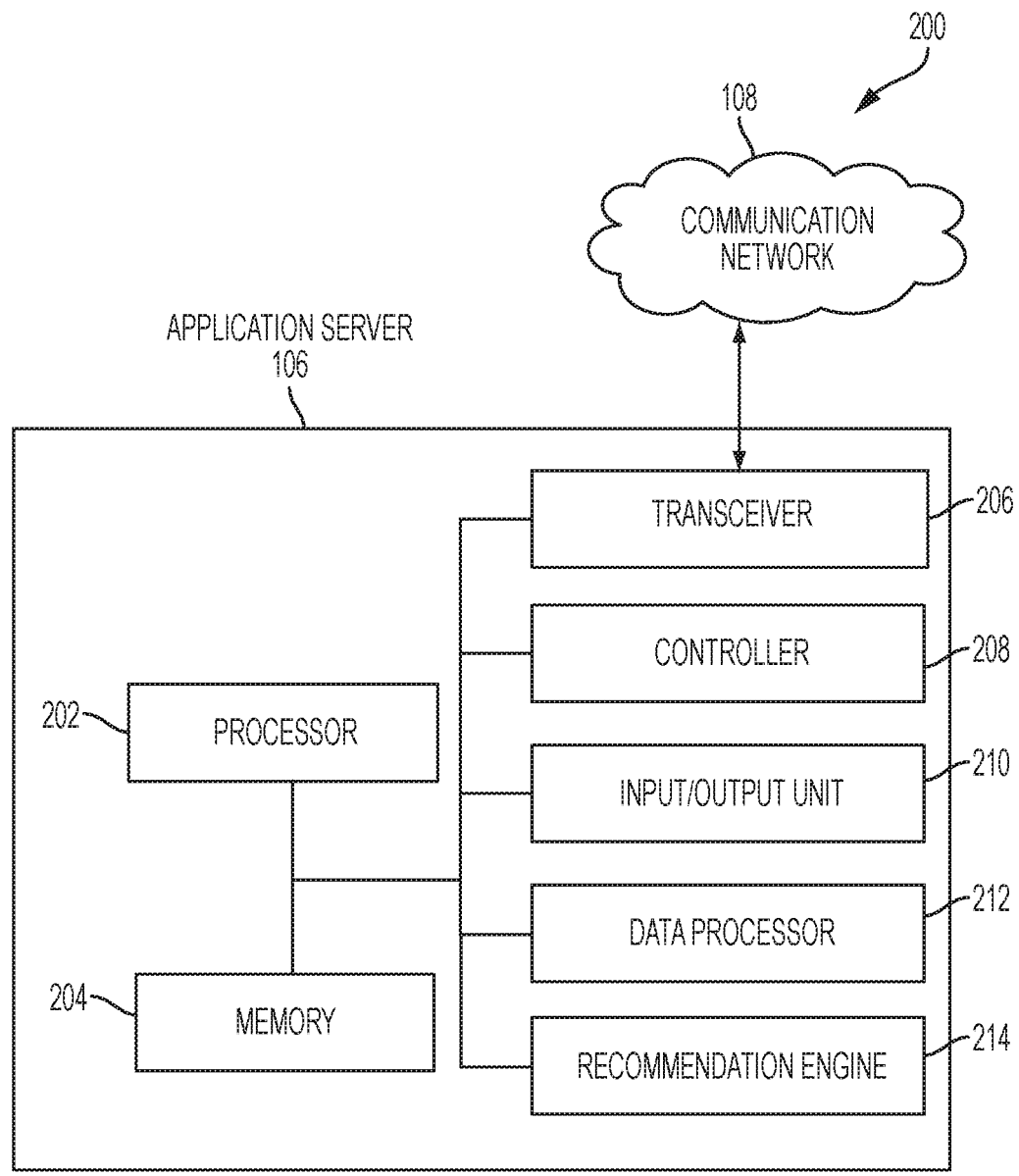
FIG. 2 is a block diagram that illustrates a system for data processing to recommend a list of physical stores in real-time for user-specified products and/or services, in accordance with at least one embodiment.

FIG. 2 is a block diagram that illustrates a system 200 for data processing to recommend a list of physical stores in real-time for user-specified products and/or services, in accordance with at least one embodiment. For the purpose of ongoing description, the system 200 may be considered as the application server 106. However, the system 200 may be realized as a server, such that the functionalities of the database server 104 and the application server 106 may be combined into the server, without deviating from the scope of the disclosure. With reference to FIG. 2, there is shown the application server 106 that is described in conjunction with the elements from FIG. 1.

In an embodiment, the application server 106 includes one or more processors, such as a processor 202, one or more memory units, such as a memory 204, one or more transceivers, such as a transceiver 206, one or more controllers, such as a controller 208, one or more input/output (I/O) units, such as an I/O unit 210, one or more data processors, such as a data processor 212 and one or more recommendation engines, such as a recommendation engine 214.

The processor 202 comprises suitable logic, circuitries, interfaces, and/or codes that may be configured to execute one or more sets of instructions, programs, or algorithms stored in the memory 204. The processor 202 may be communicatively coupled to the memory 204, the transceiver 206, the controller 208, the I/O unit 210, the data processor 212 and the recommendation engine 214. The processor 202 may be further communicatively coupled to the communication network 108. The processor 202 may be implemented based on a number of processor technologies known in the art. The processor 202 may work in coordination with the transceiver 206, the controller 208, the I/O unit 210, the data processor 212, and the recommendation engine 214 for data processing to recommend a list of physical stores in real-time for user-specified products and/or services. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may be operable to store one or more machine codes, and/or computer programs having at least one code section executable by the processor 202. The memory 204 may store the one or more sets of instructions. In an embodiment, the memory 204 may include one or more buffers (not shown). The one or more buffers may store at least one or more of, but not limited to, the one or more recommendations, the one or more user profiles, and the historical data associated with the one or more users. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the system 200 to perform the operations associated with the application server 106.

The transceiver 206 comprises suitable logic, circuitries, interfaces, and/or codes that may be configured to receive/transmit the one or more queries, data, content, or other information from/to one or more computing devices (e.g., the database server 104 or the user-computing device 102) over the communication network 108. The transceiver 206 may implement one or more known technologies to support wired or wireless communication with the communication network 108. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a Wireless Local Area Network (WLAN) and/or a MAN. The wireless communication may use any of a plurality of communication standards, protocols and technologies, such as Global System for Mobile Communications (GSM), EDGE, Wideband Code Division Multiple Access (W-CDMA), Code Division Multiple Access (CDMA), Time Division Multiple Access (TDMA), BT, Wireless Fidelity (Wi-Fi) (e.g., IEEE 802.11a, IEEE 802.11b, IEEE 802.11g and/or IEEE 802.11n), Voice over Internet Protocol (VoIP), Worldwide Interoperability for Microwave Access (WiMAX), a protocol for email, instant messaging, and/or Short Message Service (SMS).

The controller 208 comprises suitable logic, circuitries, interfaces, and/or codes that may be configured to control the recommendation list, such that the recommendations are based on the one or more user-defined parameters. The controller 208 may be communicatively coupled to the processor 202, the memory 204, the transceiver 206, the I/O unit 210, the data processor 212, and the recommendation engine 214. The controller 208 may be a plug-in board, a single integrated circuit on the motherboard, or an external device. Examples of the controller 208 include, but are not limited to, graphics controller, small computer system interface (SCSI) controller, network interface controller, memory controller, programmable interrupt controller, and terminal access controller.

The I/O unit 210 may comprise suitable logic, circuitries, interfaces, and/or codes that may be operable to receive one or more requests or queries from the user-computing device 102. The I/O unit 210 may be operable to communicate with the processor 202, the memory 204, the transceiver 206, the data processor 212, and the recommendation engine 214. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The data processor 212 comprises suitable logic, circuitries, interfaces, and/or codes that may be configured to execute one or more sets of instructions, programs, or algorithms stored in the memory 204. The data processor 212 may be communicatively coupled to the processor 202, the memory 204, the transceiver 206, the controller 208, the I/O unit 210, and the recommendation engine 214. The data processor 212 may be communicatively coupled to the communication network 108. In an embodiment, the data processor 212 may be configured to aggregate the information associated with the received request, the profile information of the user, the real-time traffic information, and the geographical locations of the plurality of physical stores. Further, in an embodiment, the data processor 212 may be configured to compute the similarity score of the user for the product and/or service in the one or more products and/or services based on the profile information. The data processor 212 may be implemented based on a number of processor technologies known in the art. Examples of the data processor 212 may include, but are not limited to, an X86-based processor, a RISC processor, an ASIC processor, a CISC processor, and/or other processor.

The recommendation engine 214 comprises suitable logic, circuitries, interfaces, and/or codes that may be configured to execute one or more sets of instructions, programs, or algorithms stored in the memory 204. The recommendation engine 214 may be configured to generate the recommendation list based on the aggregated information and the computed similarity score of the user for each of the one or more products and/or services. In an embodiment, the recommendation engine 214 may be configured to identify the pre-determined count of recommendations to constitute the recommendation list. In other words, the recommendation engine 214 may identify the "top-k" recommendations based on a cumulative similarity score of the products and/or services associated with each of the corresponding recommendations. Further, the recommendation in the recommendation list may comprise the set of products and/or services from the one or more products and/or services, the route encompassing the set of physical stores from the plurality of physical stores associated with the set of products and/or services. Further, in an embodiment, the recommendation engine 214 may be configured to rank the recommendations in the recommendation list based on the first criteria and/or the second criteria. In an embodiment, the recommendation engine 214 may be configured to update the recommendation list based on the selection of the recommendation by the user.

Figure 3:
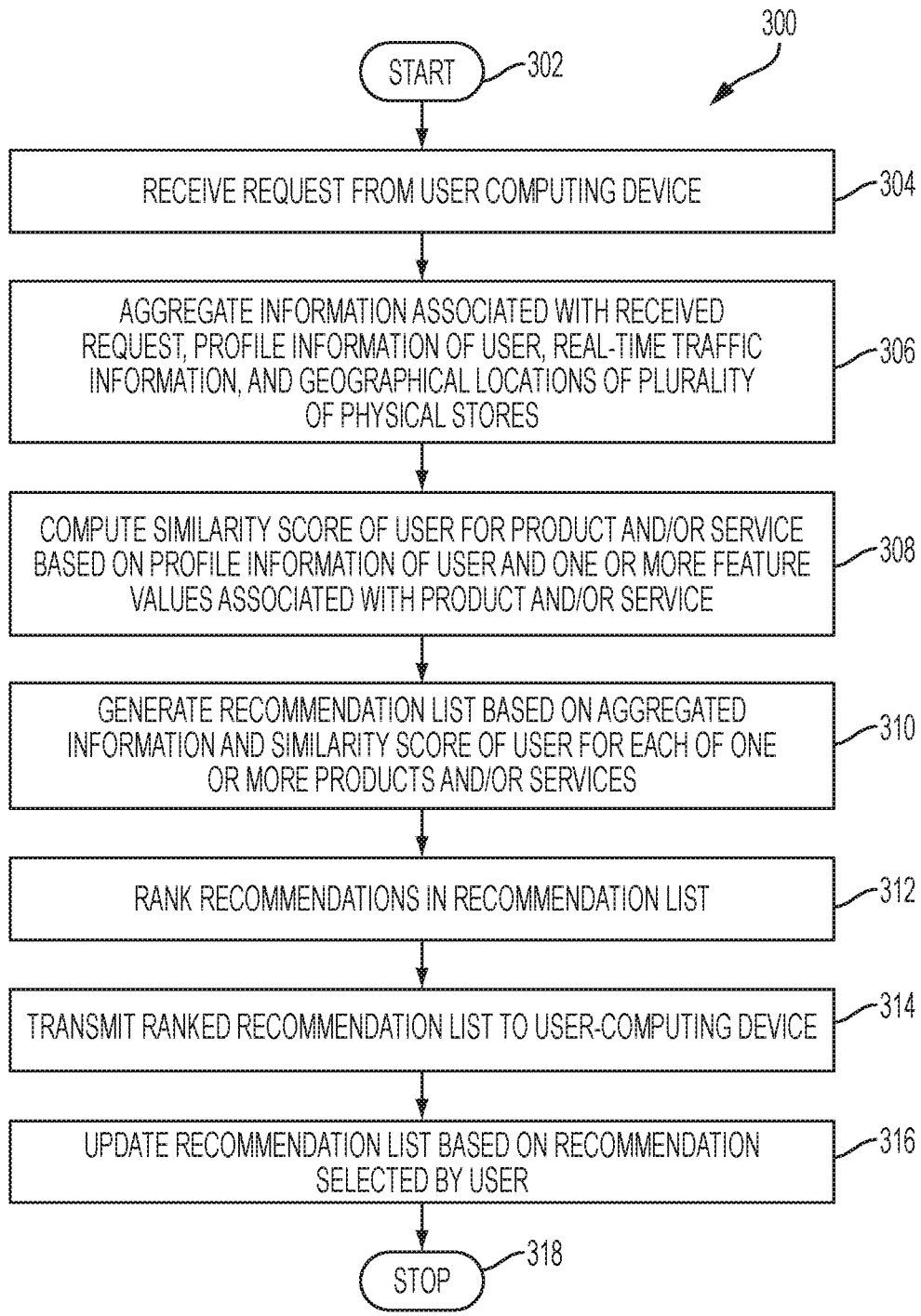
FIG. 3 is a flowchart that illustrates a method for data processing to recommend a list of physical stores in real-time for user-specified products and/or services, in accordance with at least one embodiment.

FIG. 3 is a flowchart that illustrates a method for data processing to recommend a list of physical stores in real-time for user-specified products and/or services, in accordance with at least one embodiment. FIG. 3 is described in conjunction with FIG. 1 and FIG. 2. With reference to FIG. 3, there is shown a flowchart 300 that illustrates the method for data processing to recommend the list of physical stores in real-time for the user-specified products and/or services on the user-computing device 102. The method starts at step 302 and proceeds to step 304.

At step 304, the request is received from the user-computing device 102. In an embodiment, the transceiver 206, in conjunction with the processor 202, may be configured to receive the request from the user-computing device 102, over the communication network 108. In an embodiment, the user may utilize the user-computing device 102 to transmit the request to receive recommendations of the list of physical stores for the one or more products and/or services required by the user. In an embodiment, the request may comprise the one or more products and/or services and the one or more user-defined parameters. The one or more user-defined parameters may comprise the time constraint, the budget constraint, the first geographical location of the user, and the second geographical location of the user.

In an embodiment, the user may define the first geographical location (i.e., a source location) and the second geographical location (i.e., a final destination location) in the request. In another embodiment, the user may only define the second geographical location in the request. In such an embodiment, the processor 202 may be configured to determine the first geographical location of the user based on the current location of the user.

In an exemplary scenario, the user may require to purchase products, such as "P1," "P2," and "P3," while traveling from a first geographical location "A" to a second geographical location "B." The user may want to spend "3 hours" in total for purchase and commutation. Further, the user may have a budget constraint of "USD 30." Thus, the user transmits the request to receive recommendations that meet the product requirement and the one or more user-defined parameters. The request comprises information pertaining to the products "P1," "P2," and "P3," the first geographical location "A," the second geographical location "B," the time constraint "3 hours," and the budget constraint "USD 30."

A person having ordinary skill in the art will understand that the scope of the abovementioned exemplary scenario is for illustrative purpose and should not be construed to limit the scope of the disclosure.

Thereafter, the processor 202 may be configured to process the request received from the user-computing device 102. In an embodiment, when the request does not comprise the first geographical location, the processor 202 may be configured to determine the current location of the user based on the real-time navigation data of the user. In an embodiment, the processor 202 may collect the real-time navigation data of the user by tracking the GPS sensor installed in the user-computing device 102 associated with the user.

At step 306, the information associated with the received request, the profile information of the user, the real-time traffic information and the geographical locations of the plurality of physical stores is aggregated. In an embodiment, the data processor 212 in the application server 106 may be configured to aggregate the information associated with the received request, the profile information of the user, the real-time traffic information, and the geographical locations of the plurality of the physical stores.

Prior to aggregation, in an embodiment, the data processor 212 may be configured to retrieve the profile information of the user from the database server 104 or one or more social networking websites on which the user has previously registered. In an embodiment, the profile information of the user may comprise information related to the purchase history of the plurality of products and/or services, the demographic details, and the lifestyle information of the user.

Thereafter, the data processor 212 may be configured to retrieve the real-time traffic information from the one or more traffic tracking services known in the art. Further, the data processor 212 may be configured to retrieve the map data from the database server 104. In an embodiment, the map data may comprise information pertaining to a plurality of routes, modes of transportation available on the plurality of routes, and the geographical locations of the plurality of physical stores along the plurality of routes. Thereafter, in an embodiment, the data processor 212 may be configured to aggregate the information associated with the received request, the retrieved profile information of the user, the retrieved real-time traffic information and the map data comprising the geographical locations of the plurality of physical stores. Further, the data processor 212 may be configured to store the aggregated information in the memory 204. Further, the data processor 212 for instance, may determine a relationship between the aggregated data. Further, the relationship may be created and/or modified continuously, periodically, or randomly based on sensor data.

At step 308, the similarity score of the user for each product and/or service is computed based on the profile information of the user and the one or more feature values associated with the product and/or service. In an embodiment, the data processor 212 in the application server 106 may be configured to compute the similarity score of the user for each product and/or service in the one or more products and/or services based on the profile information of the user and the one or more feature values associated with each product and/or service.

Prior to the computation of the similarity score, the data processor 212 may be configured to retrieve the product and/or service inventory associated with each physical store among the plurality of physical stores from the database server 104. Further, the data processor 212 may be configured to generate a graph G by utilizing the map data and the real-time traffic information in the aggregated information. The data processor 212 may be further configured to determine a user persona based on the profile information of the user.

In an exemplary scenario, the data processor 212 may retrieve the product and/or service inventory associated with the plurality of physical stores $R=\{r_1, r_2, r_3, r_4, \ldots r_n\}$. Further, the product and/or service inventory of a physical store $r_k \in R$ ($k \in \{1, 2, 3 \ldots n\}$) is characterized by a vector $P_k = <p_{k,1}, p_{k,2}, p_{k,3}, p_{k,|P_k|}>$ of products and/or services available in the physical store $r_k \in R$ ($k \in \{1, 2, 3 \ldots n\}$) and a vector $C_k = <c_{k,1}, c_{k,2}, c_{k,3}, c_{k,|P_k|}>$ of cost of the available products and/or services $P_k$ with $c_{k,j}$ representing the cost of a product and/or service $p_{k,j}$, where $j \in \{1, 2, \ldots |P_k|\}$. In an embodiment, the cost of a product and/or service may be based on a promotional offer, such as a discount offer. Further, a universal set of products and/or services is denoted by $U=\{p_1, p_2, \ldots p_m\}$ implying that $\forall k, \forall j: p_{k,j} \in U$.

Further, based on the map data, the data processor 212 may generate the graph $G=(V, E)$, where $V=\{V_1 \cup V_2\}$ represents a set of nodes and E represents a set of weighted directed edges between a pair of nodes in the set of nodes. Further, each node in the set of nodes V represents either some location/landmark in the map data such as an apartment, an office space, a tech park, etc. (constituting nodes $V_1$), or a physical store among the plurality of physical stores (constituting nodes $V_2$) and each edge $e_{x,y}$ in the set of weighted directed edges E represents a road connectivity (i.e., a route) between a node $v_x$ and a node $v_y$. Further, weight $t_{x,y}$ of a directed edge $e_{x,y}$ between the node $v_x$ and the node $v_y$ is based on time required to travel from the node $v_x$ to the node $v_y$ considering the real-time traffic information.

Further, the data processor 212 may be configured to utilize the profile information of the user to determine the user persona (such as a luxuriant persona or an infrequent persona). The data processor 212 may utilize the purchase history, the demographic details, and the lifestyle information of the user in the profile information of the user to determine whether the user corresponds to the luxuriant persona or the infrequent persona. Thereafter, the data processor 212 may be configured to associate pre-determined weights $W=\{w_{1,i}, w_{2,i}, w_{3,i}, w_{4,i}\}$ for the one or more feature categories, such as brand consciousness, product popularity, media influence, and promotion respectively, pertaining to the determined user persona (denoted by i where i=1 for the luxuriant persona and i=2 for the infrequent persona) for the user. The weight (for the user) signifies the importance of a feature category to a specific user persona. For example, weight $w_{1,1}$ signifies the importance of brand consciousness (i.e., a feature category) to the luxuriant persona. In an embodiment, the data processor 212 may be configured to determine the weights for the corresponding user persona for the one or more feature categories based on the purchase history of the plurality of users.

A person having ordinary skill in the art will understand that the above mentioned exemplary scenario is for illustrative purpose and should not be construed to limit the scope of the disclosure.

Thereafter, the data processor 212 may be configured to utilize the retrieved product and/or service inventory, the determined user persona, and the graph G for the computation of the similarity score of the user for each of the one or more products and/or services. In an embodiment, the data processor 212 may utilize the product and/or service inventory to identify products and/or services, in the plurality of physical stores, matching the one or more products and/or services specified by the user in the user request. Thereafter, the data processor 212 may be configured to determine the one or more feature values associated with each of the matched products and/or services for the one or more feature categories.

In an exemplary scenario, the data processor 212 may identify products and/or services M matching the one or more products and/or services. The data processor 212 determines the one or more feature values $\{C_{1,m}, C_{2,m}, C_{3,m}, C_{4,m}\}$ for the one or more feature categories, such as brand consciousness, product popularity, media influence, and promotion, respectively, for a matched product and/or service $m \in M$. The one or more feature values of a product and/or service for the one or more feature categories may be determined based on historical data associated with the product and/or service. The historical data may be collected from one or more social networking websites based on one or more parameters, such as popularity of the product and/or service.

A person having ordinary skill in the art will understand that the abovementioned exemplary scenario is for illustrative purpose and should not be construed to limit scope of the disclosure. A person having ordinary skill in the art will further understand that in a possible scenario no matching product and/or service may be identified by the data processor 212 for a product and/or service in the one or more products and/or services specified by the user.

In an embodiment, the data processor 212 may be configured to compute the similarity score by utilizing the weights W associated with the user and the one or more feature values associated with the identified products and/or services M. In an exemplary scenario, the data processor 212 may utilize equation (1), as shown below, for computing the similarity score of the user for a product and/or service $\pi_i$ with corresponding matched products and/or services m ∈ M (available at a retail store $r_k$):

$$S^u_{r_k,\pi_i} = \left\{ \sum_{j=1}^{4} w_{j,p} * \frac{1}{1+|C_{j,m} - f_j|^2} \right\} \quad (1)$$

where, u represents the user, with user persona p, who transmitted the request;

$\pi_i$ represents a product and/or service among the one or more products and/or services specified by the user in the request. Further, the product and/or service $\pi_i$ has the one or more feature values as $\{f_1, f_2, f_3, f_4\}$;

$r_k$ represents the physical store in which the matched product and/or service m corresponding to the product and/or service $\pi_i$ is available. Further, the matched product and/or service m has the one or more feature values as $\{C_{1,m}, C_{2,m}, C_{3,m}, C_{4,m}\}$;

$w_{j,p}$ represents the weights of the user u for the one or more feature categories; and $S^u_{r_k,\pi_i}$ represents the similarity score of the user for the product and/or service $\pi_i$ with the corresponding matched product and/or service m.

A person having ordinary skill in the art will understand that the abovementioned exemplary scenario is for illustrative purpose and should not be construed to limit the scope of the disclosure. Further, the similarity score of different users with the different user personas for a product and/or service with a matched product and/or service may be different. For example, the similarity score of the user, with luxuriant persona, for a high-end wristwatch in a physical store may be higher as compared to that of another user with infrequent persona. Further, the similarity score of the user for a product and/or service with an unmatched product and/or service may be zero.

A person having ordinary skill in the art will understand that the abovementioned example is for illustrative purpose and should not be construed to limit the scope of the disclosure.

Thereafter, the data processor 212 may be configured to update the product and/or service inventory of the plurality of physical stores by adding another vector, such as the similarity score, corresponding to the matched products and/or services. For example, the updated product and/or service inventory of a physical store $r_k$ ∈ R (k ∈ {1, 2, 3 ... n}) is characterized by a vector $P_k = <p_{k,1}, p_{k,2}, p_{k,3}, ..., p_{k,|P_k|}>$ of products and/or services available in the physical store $r_k$ ∈ R (k ∈ {1, 2, 3 ... n}), a vector $C_k = <c_{k,1}, c_{k,2}, c_{k,3}, ..., c_{k,|P_k|}>$ of cost of the available products and/or services $P_k$ with $c_{k,j}$ representing the cost of a product and/or service $p_{k,j}$, where j ∈ {1, 2, ... |P_k|}, and another vector $S^u_{r_k,\pi_i}$ representing the similarity score corresponding to the matched product and/or service for $\pi_i$ in the physical store $r_k$. For example, if product $p_{k,3}$ in the physical store $r_k$ matches a product $\pi_i$ specified by the user, the similarity vector in the updated product and/or service inventory of the physical store $r_k$ may be represented as $<0, 0, s_{r_k,\pi_i}^u, ..., 0>$.

A person having ordinary skill in the art will understand that the abovementioned example is for illustrative purpose and should not be construed to limit the scope of the disclosure.

At step 310, the recommendation list is generated based on the aggregated information and the computed similarity score of the user for each of the one or more products and/or services. In an embodiment, the recommendation engine 214 in the computing device may generate the recommendation list based on the aggregated information and the computed similarity score of the user for each of the one or more products and/or services. In an embodiment, a recommendation in the generated recommendation list may comprise the set of products and/or services from the one or more products and/or services, the route encompassing the set of physical stores from the plurality of physical stores associated with the set of products and/or services. Further, each recommendation may comprise a corresponding order in which the products and/or services in the set of products and/or services may be purchased and/or availed.

For example, the user may have requested for products and/or services, such as ($\pi_1, \pi_2, \pi_3$), in the request. In this scenario, the processor 202 may be configured to generate one or more possible permutations and combinations, such as ($\pi_1, \pi_2, \pi_3$), ($\pi_1, \pi_3, \pi_2$), ($\pi_3, \pi_1, \pi_2$), ($\pi_3, \pi_2, \pi_1$), ($\pi_2, \pi_1, \pi_3$), and ($\pi_2, \pi_3, \pi_1$), of the requested one or more products and/or services.

In an embodiment, the recommendation engine 214 may be configured to identify a route by utilizing the graph G between the first geographical location and the second geographical location for each of the one or more possible permutations and combinations of the requested one or more products and/or services. Further, for a given combination, such as ($\pi_3, \pi_2, \pi_1$), the recommendation engine 214 may identify the route such that the product and/or service $\pi_3$ is purchased and/or availed prior to the products and/or services, such as $\pi_2$ and $\pi_1$. Further, the product and/or service $\pi_2$ can be picked up and/or availed from the corresponding physical store if and only if the product and/or service $\pi_3$ has already been picked up and/or availed and same for the product and/or service $\pi_1$. Further, the recommendation engine 214 may identify the route in such a way that the route encompasses a set of physical stores where the set of products and/or services is available. Further, the recommendation engine 214 further ensures that the identified route meets the time constraint and the budget constraint as specified by the user in the request.

In an exemplary scenario, for a particular permutation and combination, such as p=($\pi_3, \pi_1, \pi_2$), of the requested one or more products and/or services the recommendation engine 214 may generate a four-dimensional tabular structure $R_p$, based on one or more dynamic programming techniques. The first dimension ($D_1$) of the four-dimensional tabular structure $R_p$ is associated with the time constraint and is represented as t∀t ∈ [0, $t^u$+1]. Further, $t^u$ represents the time constraint specified by the user u. The second dimension ($D_2$) of the four-dimensional tabular structure $R_p$ comprises the one or more nodes $V_1 \cup V_2$ in the graph G and may be considered as v ∈ [0, $|V_1 \cup V_2|$−1]. The third dimension ($D_3$) of the four-dimensional tabular structure $R_p$ corresponds to a count of products and/or services picked up and/or availed by the user u and may be represented as i, i ∈ [0, $|\pi^u|$], where $|\pi^u|$=3. Further, the fourth dimension ($D_4$) of the four-dimensional tabular structure $R_p$ is associated with the budget constraint of the user u and may be represented as b, ∀ b ∈[0, $b^u$+1], $b^u$ represents the budget constraint of the user u.

In an embodiment, an entry in the four-dimensional tabular structure $R_p$ stores a cumulative sum of similarity scores for a given time t, node v, count of products and/or services picked and/or availed i and cost budget b incurred so far is represented as $R_{p[t'][v][i][b]}$. Further, the recommendation engine 214 may be configured to maintain a list $L_{t',v,i,b}$ for each entry $R_{p[t'][v][i][b]}$ in the four-dimensional tabular structure $R_p$. In an embodiment, while transiting from a node u to a node v, the list $L_{t',v,i,b}$ comprises the products and/or services that can be picked up or availed from the node v minus the products and/or services already picked up and/or availed. The recommendation engine 214 may be configured to execute a substructure for every transition from the node u (i.e., the current node) to a successive node v (along a route between the first geographical location and the second geographical location). Further, based on the execution of the substructure, the recommendation engine 214 may be configured to update the entry and the list in the four-dimensional tabular structure $R_p$. The count of entries in the four-dimensional tabular structure $R_p$ may be equal to a count of routes available between the first geographical location and the second geographical location. Further, an entry in the four-dimensional tabular structure $R_p$ may be associated with a route among the routes available between the first geographical location and the second geographical location.

The recommendation engine 214 may set an initial condition, such as $R_{p[t'][v][i][b]}$=0, for t'=0, 0≤v<|$V_1 \cup V_2$|−1, 0≤i<|$\pi^u$|, and 0≤b<$b^u$, for the entry in the four-dimensional tabular structure $R_p$. The recommendation engine 214 may utilize equation (2), as shown below, for executing the substructure:

$$R_{p[t'][v][i][b]} = \max\left(R_{p[t'-1][v][i][b]},\right.$$
$$\max_{u,i',b'}\left(\lambda\left(\sum_{j\in L} s^u_{v,\pi_j} + R_{[t'-t_{u,t'}][u][i'][b']}\right)\right), \max_{u,i',b'}\left(\lambda\left(R_{[t'-t_{u,t'}][u][i'][b']}\right)\right)$$

where, $$\max_{u,i',b'}\left(\lambda\left(\sum_{j\in L} s^u_{v,\pi_j} + R_{[t'-t_{u,t'}][u][i'][b']}\right)\right)$$

denotes that u ∈$V_1 \cup V_2$, such that (u, v) ∈E. Further, $t'-t_{u,t'}$>0 represents that the user reached at a node u at time $t'-t_{u,t'}$. Further, i'<i and represents the count of products and/or services picked and/or availed when the user reached at node u. Further, b'<b and represents the cost at the node u.

λ represents a Boolean variable. For a node v, λ is set to "1" when the directed weighted edge (u, v) connecting the node u and the node v is not previously traversed and the time constraint and the budget constraint are met by traversing the directed weighted edge (u, v) when the node v contains products and/or services indexed i'+1 to i. Further, λ is set to "0" if the time constraint and the budget constraint are not met by traversing the directed weighted edge (u, v).

After the execution of the substructure for every transition from the node u (i.e., the current node) to a successive node v for all available routes between the first geographical location and the second geographical location, the recommendation engine 214 may be configured to identify the highest entry in the four-dimensional tabular structure $R_p$ corresponding to the particular permutation and combination p=($\pi_3$, $\pi_1$, $\pi_2$). The highest entry may represent the maximum cumulative similarity score along the corresponding route. Similarly, the recommendation engine 214 may be configured to identify the highest entry in the corresponding four-dimensional tabular structure $R_p$ for each of the one or more possible permutations and combinations. Further, the identified entries corresponding to each of the one or more possible permutations and combinations correspond to the recommendations for the one or more possible permutations and combinations. Thereafter, the recommendation engine 214 may be configured to identify the pre-determined count of the recommendations from the recommendations associated with the one or more possible permutations and combinations. In other words, the recommendation engine 214 may be configured to identify recommendations associated with "top-k" (where k corresponds to the pre-determined count) highest entries. The pre-determined count of recommendations, each comprising a route encompassing the set of physical stores associated with the set of products and/or services may constitute the recommendation list.

A person having ordinary skill in the art will understand that the abovementioned exemplary scenario is for illustrative purpose and should not be construed to limit the scope of the disclosure.

In a scenario, when the set of products and/or services constituted by a recommendation comprises the one or more products and/or services, the recommendation may correspond to an optimal recommendation. Further, the optimal recommendation satisfies the time constraint, the budget constraint, and meets the requirements of the one or more products and/or services as specified by the user completely.

In another embodiment, when the identified recommendations for the one or more possible permutations and combinations is less than the pre-determined count, the recommendation engine 214 utilizes a greedy technique or a heuristic technique, such as multiple choice knapsack technique, known in the art to further identify the pre-determined count of recommendations. The heuristic technique ensures that the time constraint and the budget constraint are met but relaxes the requirements of the one or more products and/or services as specified by the user. Thus, along with optimal recommendations, other recommendations that partially meet the requirements of the one or more products and/or services as specified by the user are identified. Such other recommendations correspond to sub-optimal recommendations. For example, a sub-optimal recommendation comprises a route that encompasses the set of physical stores associated with the set of products and/or services such that the set of products and/or services comprises a partial list of the one or more products and/or services as specified by the user in the user request. The heuristic technique further utilizes a shortest path algorithm known in the art to identify the route associated with each recommendation. Further, the recommendation engine 214 may be configured to identify the pre-determined count of the recommendations from the output of the heuristic technique. In other words, the recommendation engine 214 may be configured to identify the "top-k" (i.e., k corresponds to the pre-determined count) outputs (i.e., the optimal recommendations and the sub-optimal recommendations) of the heuristic technique. The pre-determined count of recommendations, each comprising a route encompassing the set of physical stores associated with the set of products and/or services may constitute the recommendation list.

In an exemplary scenario, a user may have transmitted a request for one or more products and/or services ("P1," "P2," "P3," and "P4") with a time constraint "T1" and a budget constraint "USD 300." The user may have specified the first geographical location "S" and the second geographical location "D" in the request. The data processor 212 may determine that the user corresponds to the luxuriant persona based on the profile information of the user. The recommendation engine 214 may generate the recommendation list comprising recommendations ("R1," "R2," and "R3"). The recommendation "R1" comprises a route ("S"→"PS1"→"PS2"→"PS3"→"PS4"→"D") that encompasses the set of physical stores ("PS1"→"PS2"→"PS3"→"PS4"), where the one or more products and/or services "P1," "P2," "P3," and "P4," respectively, are available. Further, "USD 40," "USD 30," "USD 50" and "USD 200" represent the cost of the one or more products and/or services "P1," "P2," "P3," and "P4," respectively, as offered by the corresponding physical stores "PS1," "PS2," "PS3," and "PS4." Further, the route in recommendation "R1" meets the time constraint "T1" and the budget constraint "USD 300" of the user. The recommendation "R2" comprises a route ("S"→"PS1"→"PS5"→"PS3"→"PS6"→"D") that encompasses the set of physical stores ("PS1"→"PS5"→"PS3"→"PS6"), where the one or more products and/or services "P1," "P4," "P3," and "P2," respectively, are available. Further, "USD 40," "USD 160," "USD 50" and "USD 50" represent the cost of the one or more products and/or services "P1," "P4," "P3," and "P2," respectively, as offered by the corresponding physical stores "PS1," "PS5," "PS3," and "PS6." Further, the route in recommendation "R2" meets the time constraint "T1" and the budget constraint "USD 300" of the user. The recommendations "R1" and "R2" correspond to the optimal recommendations as the product and/or service requirement of the user is completely met. The recommendation "R3" comprises a route ("S"→"PS1"→"PS7"→"PS3"→"D") that encompasses the set of physical stores ("PS1"→"PS7"→"PS3"), where only three products and/or services "P1," "P2," and "P3," respectively, of the one or more products and/or services "P1," "P2," "P3," and "P4" are available. Further, "USD 40," "USD 50," and "USD 50" represent the cost of the three products and/or services "P1," "P2," and "P3," respectively, as offered by the corresponding physical stores "PS1," "PS7," and "PS3." Further, the route in recommendation "R3" meets the time constraint "T1" and the budget constraint "USD 300" of the user. The recommendation "R3" corresponds to the sub-optimal recommendation as the product and/or the service requirement of the user is partially met. Further, the recommendation engine 214 may not select a route ("S"→"PS1"→"PS8"→"PS3"→"PS9"→"D") that meets the budget constraint "B1" and the product and/or the service requirement of the user completely but violates the time constraint "T1" specified by the user in the request.

A person having ordinary skill in the art will understand that the abovementioned exemplary scenario is for illustrative purpose and should not be construed to limit the scope of the disclosure. Further, a person having ordinary skill in the art will understand that the recommendation engine 214 may not generate the same recommendation list if the data processor 212 determines the user persona as infrequent.

At step 312, the recommendations in the recommendation list are ranked. In an embodiment, the recommendation engine 214 in the application server 106 may be configured to rank the recommendations in the recommendation list. In an embodiment, the recommendation engine 214 may be configured to rank the recommendations in the recommendation list based on the first criteria and/or the second criteria.

In an embodiment, the first criteria may correspond to the count of products and/or services in the set of products and/or services associated with each recommendation in the recommendation list. For example, a route in a first recommendation may encompass the set of physical stores associated with "5" out of "7" products and/or services specified by the user. Another route in a second recommendation may encompass the set of physical stores associated with "7" out of "7" products and/or services specified by the user. In such a case, the second recommendation may be ranked higher in comparison to the first recommendation. Thus, the recommendation engine 214 may rank the optimal recommendations higher in comparison to the sub-optimal recommendations.

In an embodiment, the second criteria may correspond to the similarity score associated with each product and/or service in the set of products and/or services associated with each recommendation in the recommendation list. In an embodiment, when the count of products and/or services in the set of products and/or services associated with recommendations in the recommendation list is same, the recommendation engine 214 may utilize the second criteria to rank the recommendations in the recommendation list. The recommendation engine 214 may be configured to identify the cumulative similarity score associated with each recommendation based on the four dimensional tabular structure $R_p$. Thereafter, based on the cumulative similarity score associated with each recommendation, the recommendation engine 214 may be configured to rank the recommendations in either ascending order or descending order. For example, the cumulative similarity score for a first recommendation may be "0.98" and the cumulative similarity score for a second recommendation may be "0.78." However, both the recommendations are associated with the one or more products and/or service as specified by the user. In such a case, the recommendation engine 214 may rank the first recommendation higher in comparison to the second recommendation in the recommendation list due to a higher cumulative similarity score.

A person having ordinary skill in the art will understand that the abovementioned exemplary scenarios are for illustrative purpose and should not be construed to limit the scope of the disclosure.

At step 314, the ranked recommendation list is transmitted to the user-computing device 102. In an embodiment, the transceiver 206, in conjunction with the processor 202, may be configured to transmit the ranked recommendation list to the user-computing device 102. In an embodiment, a user interface may be presented on the user-computing device 102 to display each recommendation in the ranked recommendation list. Further, the user may select a recommendation from the recommendation list by utilizing the user-computing device 102 for purchasing and/or availing products and/or services based on the selected recommendation.

In an embodiment, after receiving the selection of the recommendation by the user, the data processor 212, in conjunction with the processor 202, may be configured to track the real-time location of the user based on the real-time navigation data from the user-computing device 102. Further, the data processor 212 may be configured to guide the user through the remaining route to be traversed. For example, the recommendation selected by the user comprises a route "R1" (i.e., "S"→"PS1"→"PS2"→"PS3"→"PS4"→"D"). Further, based on the real-time location of the user the data processor 212 determines that the user is currently at the physical store "PS2." Thus, the data processor 212 may further guide the user for the remaining route (i.e., "PS2"→"PS3"→"PS4"→"D").

A person having ordinary skill in the art will understand that the abovementioned exemplary scenario is for illustrative purpose and should not be construed to limit the scope of the disclosure.

At step 316, the recommendation list is updated based on the recommendation selected by the user. In an embodiment, the recommendation engine 214, in conjunction with the controller 208, may be configured to update the recommendation list based on the recommendation selected by the user. In an embodiment, the user may utilize the user-computing device 102 to provide a feedback. In an embodiment, the selection by the user may correspond to the feedback. In another embodiment, the feedback may further comprise one or more instructions provided by the user pertaining to the displayed recommendation list. For example, the one or more instructions may include an exclusion of a particular physical store, an exclusion of a route constituted by a recommendation in the recommendation list, an exclusion of a particular order in which products and/or services are purchased and/or availed, or an inclusion of products and/or services with promotional offers at higher preference. Thereafter, based on the feedback received from the user, the data processor 212 may be configured to update the recommendation list.

A person having ordinary skill in the art will understand that the scope of the disclosure is not limited to the transmission of the feedback by the user after receiving the recommendation list. In another embodiment, the user may provide the feedback at the time of transmission of the request.

Further, the recommendation engine 214 may be configured to provide the updated recommendations to the user-computing device 102 associated with the user, while the user is in transit from the first geographical location to the second geographical location. In this scenario, the recommendation engine 214 may utilize the real-time navigation data from the user-computing device 102 for updating the recommendation list. In an exemplary scenario, the recommendation engine 214 determines that the user has exceeded the expected time limit to be spent in a physical store while following the route in the selected recommendation. Further, the recommendation engine 214 determines that if the user keeps on following the same route in the selected recommendation, the time constraint specified by the user may get violated. In such a case, recommendation engine 214 may be configured to execute the entire recommendation process again to provide the updated recommendation list based on the current geographical location of the user and the second geographical location, such that the time constraint is met.

In another exemplary scenario, the user may provide the feedback by changing the second geographical location by use of the user-computing device 102, while the user is still in transit on the route in the selected recommendation. In such a case, the recommendation engine 214 may instantly determine the new second geographical location. Thus, the recommendation engine 214 may be configured to execute the entire recommendation process again to provide the updated recommendation list based on the current geographical location of the user and the new second geographical location.

A person having ordinary skill in the art will understand that the abovementioned exemplary scenarios are for illustrative purpose and should not be construed to limit the scope of the disclosure.

In another embodiment, the recommendation engine 214 may be configured to update the recommendation list based on availability of a product and/or service at a projected time stamp in an identified physical store corresponding to a recommendation. The projected time stamp may be based on the real-time traffic information between the current geographical location of the user and the second geographical location. For example, a user may select a recommendation "R1" in the recommendation list comprising three recommendation "R1," "R2," and "R3." The selected recommendation "R1" comprises a route ("S"→"PS1"→"PS2"→"PS3"→"PS4"→"D") that encompasses the set of physical stores ("PS1"→"PS2"→"PS3"→"PS4"), where the one or more products "P1," "P2," "P3," and "P4," respectively, are available. Based on the product and/or service inventory of the physical store "PS3," the recommendation engine 214 may identify that the corresponding product "P3" is no longer available. In such a scenario, the recommendation engine 214 may be configured to execute the entire recommendation process again to provide the updated recommendation list based on the current geographical location of the user and the second geographical location.

A person having ordinary skill in the art will understand that the abovementioned exemplary scenarios are for illustrative purpose and should not be construed to limit the scope of the disclosure.

The control passes to end step 318.

Figure 4:
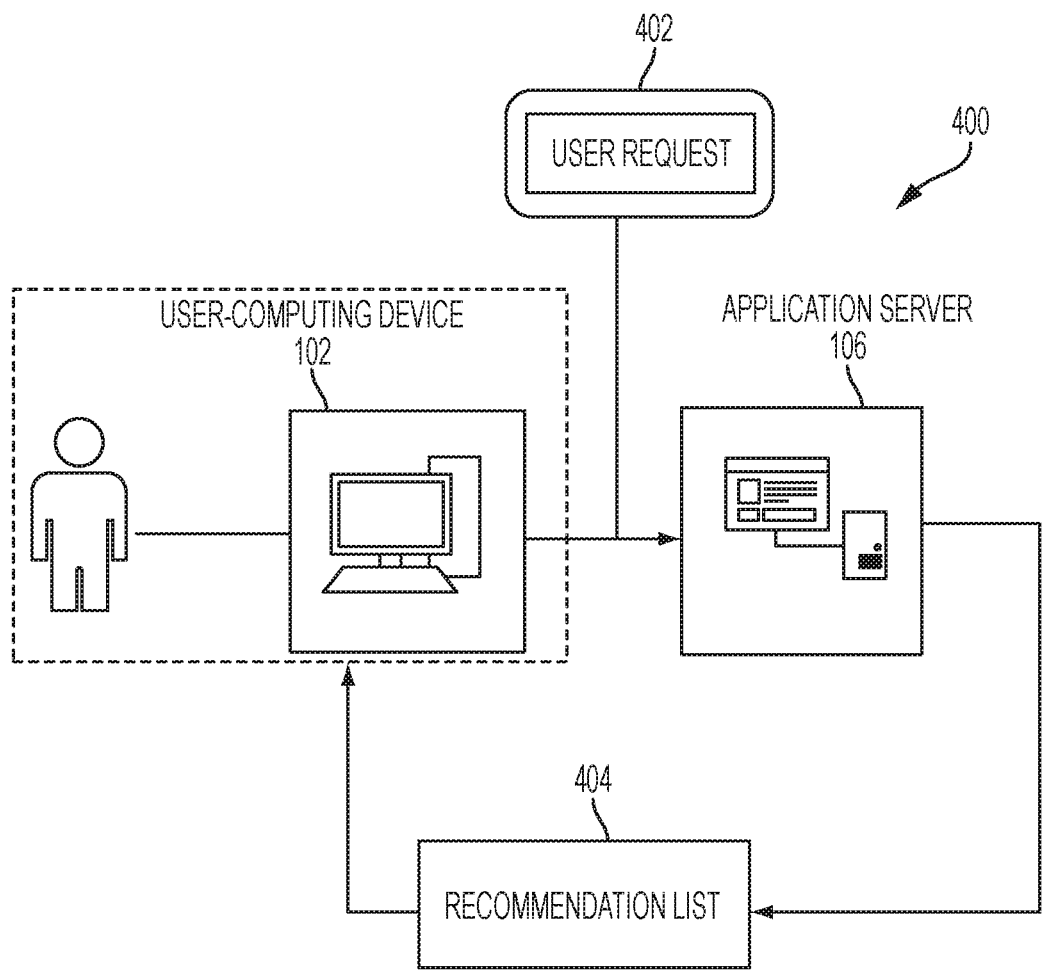
FIG. 4 is a block diagram illustrating an exemplary system environment for data processing to recommend a list of physical stores in real-time for user-specified products and/or services, in accordance with at least one embodiment.

FIG. 4 is a block diagram illustrating an exemplary system environment 400 for data processing to recommend a list of physical stores in real-time for user-specified products and/or services, in accordance with at least one embodiment. With reference to FIG. 4, there is shown a system environment 400 that has been described in conjunction with FIG. 1, FIG. 2, and FIG. 3.

The user associated with the user-computing device 102 may generate a user request 402 for receiving recommendations of a list of physical stores for one or more products and/or services. The user request 402 further comprises a time constraint "T1," a budget constraint "B1," a first geographical location "S," and a second geographical location "D." After receiving the user request 402, the application server 106 may aggregate the information associated with the received user request 402, profile information of the user, real-time traffic information, and geographical locations of a plurality of physical stores. Further, the application server 106, based on the profile information of the user retrieved from the database server 104, may identify the user persona of the user. Further, the application server 106 may be configured to identify products and/or services in the plurality of physical stores that matches the one or more products and/or services specified by the user in the user request 402. Thereafter, the application server 106 may compute the similarity score of the user for each of the requested one or more products and/or services with respect to the corresponding matched products and/or services available in the plurality of physical stores. After determining the similarity scores, the application server 106 may generate the recommendation list 404 which comprises one or more recommendations ranked based on the first criteria and/or second criteria. Further, a recommendation in the recommendation list 404 may comprise a set of products and/or services, the route encompassing the set of physical stores associated with the set of products and/or services between the first geographical location "S" to the second geographical location "D," the cost of each products and/or services in the set of products and/or services. Further, each recommendation in the recommendation list 404 must meet the time constraint "T1" and the budget constraint "B1" specified by the user in the user request 402. Thereafter, the application server 106 may present the recommendation list 404 to the user through a user interface displayed on the user-computing device 102. Further, the user may utilize the user-computing device 102 for selecting a recommendation in the recommendation list 404. The user may further provide a feedback along with the selection of the recommendation. Thereafter, the application server 106 may update the recommendation list 404 in real-time based on the feedback provided by the user and may present the updated recommendation list to the user.

FIG. 5 illustrates an exemplary scenario 500 for presenting a user-interface for displaying a recommendation list on a user-computing device based on a user request, in accordance with at least one embodiment. FIG. 5 is described in conjunction with FIG. 1 to FIG. 4.

With reference to FIG. 5, there is shown an exemplary scenario 500 for presenting a user-interface 502 for displaying a recommendation list on a display screen 102A of the user-computing device 102 based on the user request received from the user-computing device 102. The user-interface 502 comprises a first section 504 and a second section 506. The first section 504 displays the recommendations, such as recommendation "R1," "R2," and "R3," in the recommendation list. Further, an estimated time to travel (ETT) along a route associated with a recommendation is also displayed along with the recommendations, such as recommendation "R1," "R2," and "R3." Further, each recommendation, such as "R1," "R2," and "R3," in the recommendation list is associated with a radio button, such as radio button 508A, 508B, and 508C, respectively, and an expansion/collapse field, such as 510A, 510B, and 510C, respectively. The user may select any recommendation, such as the recommendation "R2," by clicking on the corresponding radio button, such as 508B. The user may further view the details pertaining to any recommendation, such as the recommendation "R2," by clicking on the expansion/collapse field, such as 510B. The details pertaining to any recommendation may include product and/or service available at a physical store, cost of the available product and/or service, and an expected time of arrival at each of the physical stores, such as (physical store "PS1," product "P1," cost "C1," expected arrival time "T1") in the corresponding recommendation.

The second section 506 presents a geographical map 512 comprising a route 514 associated with a recommendation, such as recommendation "R2," in the recommendation list. The route comprises the geographical location of the set of physical stores, such as physical stores "PS1" and "PS2," (between the first geographical location "S" and the second geographical location "D") associated with the recommendation. In an embodiment, when the user has already selected a recommendation, such as recommendation "R2," by clicking on the corresponding radio button, such as 508B, from the recommendation list, a current location 516 of the user is also displayed on the geographical map 512. The current location 516 of the user is updated as the user travels along the route 514 associated with the selected recommendation.

A person having ordinary skill in the art will understand that the abovementioned exemplary scenario is for illustrative purpose and should not be construed to limit the scope of the disclosure.

The disclosed embodiments encompass numerous advantages. The disclosure provides method for data processing to recommend a list of physical stores in real-time for user-specified products and/or services. The disclosed method includes generating a recommendation list based on aggregated information associated with a request received from a user, profile information of the user, real-time traffic information, and geographical locations of a plurality of physical stores. Further, the disclosed method utilizes similarity scores of the user for each of one or more products and/or services specified in the user request to generate the recommendation list. As the similarity scores are computed based on profile information of the user, the generated recommendation list is directly related to the persona of the user. Further, the recommendations in the recommendation list meet user-specified constraints, such as a time constraint and a budget constraint. Thus, the disclosed method sets an upper bound on money and time the user is willing to spend on products (and/or services) and commuting. Further, each recommendation in the recommendation list comprises a route encompassing a set of physical stores where the required one or more products and/or services are available. Thus, the disclosed method provides an easier and better shopping experience to the user, where no time is required to be spent on identifying a best route to take. The disclosed method also maximizes the value for money for the user by considering an aspect of promotional offers declared by the physical stores. Further, the disclosed method automatically customizes the recommendation in real-time based on the recommendation selected by the user. The disclosed method further has a pseudo-polynomial time complexity with respect to the time constraint and the budget constraint, and an exponential time complexity with respect to the count of products and/or services required by the user. The disclosed method may be utilized by any user/customer who is willing to purchase and/or avail products and/or services from the physical stores. The disclosed method is further useful for service providers (i.e., vendors at physical stores) as the problem of limited infrastructure for showcasing products is overcome.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit.

The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for data processing to recommend a list of physical stores in a real-time for one or more user-specified products and/or services have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for data processing to recommend a list of physical stores in real-time for user-specified products and/or services, said method comprising:

receiving, by one or more transceivers in a computing device, a request from a user-computing device associated with a user, over a communication network, wherein said request comprises one or more products and/or services and one or more user-defined parameters;

aggregating, by a data processor in said computing device, information associated with said received request, profile information of said user, real-time traffic information, and geographical locations of a plurality of physical stores;

applying, by a recommendation engine in said computing device, an exponential time complexity to the one or more products and/or services, and a pseudo-polynomial time complexity to the one or more user-defined parameters;

computing, by said data processor in said computing device, a similarity score of said user for each of said one or more products and/or services using:

$$S_{r_k,\pi_i}^u = \left\{ \sum_{j=1}^{4} w_{j,p} * \frac{1}{1 + |C_{j,m} - f_j|^2} \right\}$$

where:
  u represents the user, with user persona p, who transmitted the request,
  $\pi_i$ represents a product and/or service among the one or more products and/or services specified by the user in the request,
  $r_k$ represents the physical store in which the matched product and/or service m corresponding to the product and/or service $\pi_i$ is available,
  $w_{j,p}$ represents the weights of the user u for the one or more feature categories,
  $S_{r_k,\pi_i}^u$ represents the similarity score of the user for the product and/or service $\pi_i$ with the corresponding matched product and/or service m,
  $C_{j,m}$ represents feature values associated with a matched product and/or service m, and f<sub>i</sub> represents feature value for one or more products and/or services specified by the user;

generating, by the recommendation engine in said computing device, a recommendation list based on said aggregated information and said similarity score of said user for each of said one or more products and/or services, wherein at least one recommendation in said generated recommendation list comprises a set of products and/or services from said one or more products and/or services, a route encompassing a set of physical stores from said plurality of physical stores associated with said set of products and/or services; and transmitting, by said one or more transceivers in said computing device, said generated recommendation list to said user-computing device, wherein a recommendation is selected from said recommendation list by said user for purchasing and/or availing products and/or services based on said selected recommendation.

2. The method of claim 1, wherein said one or more user-defined parameters comprise at least a time constraint, a budget constraint, a first geographical location of said user and a second geographical location of said user.

3. The method of claim 1, wherein said profile information of said user comprises at least a purchase history for a plurality of products and/or services, demographic details, and lifestyle information of said user.

4. The method of claim 1, wherein said similarity score of said user for each product and/or service in said one or more products and/or services is computed based on said profile information.

5. The method of claim 4, wherein said similarity score is further computed based on one or more feature values associated with said product and/or service for said one or more feature categories.

6. The method of claim 4 further comprising ranking, by said recommendation engine in said computing device, recommendations in said recommendation list based on a first criteria and/or a second criteria.

7. The method of claim 6, wherein said first criteria corresponds to a count of products and/or services in said set of products and/or services associated with each recommendation in said recommendation list.

8. The method of claim 6, wherein said second criteria corresponds to said similarity score associated with each product and/or service in said set of products and/or services.

9. The method of claim 1 further comprising updating, by said recommendation engine in said computing device, said recommendation list based on said selection of said recommendation by said user, wherein said selection corresponds to a feedback received from said user.

10. The method of claim 1, wherein said recommendation in said recommendation list further comprises a cost of each of said set of products and/or services and a current offer on said set of products and/or services.

11. A system for data processing to recommend a list of physical stores in real-time for user-specified products and/or services, said method comprising:

one or more transceivers in a computing device configured to:

receive a request from a user-computing device associated with a user, over a communication network, wherein said request comprises one or more products and/or services and one or more user-defined parameters;

a data processor in said computing device configured to:

aggregate information associated with said received request, profile information of said user, real-time traffic information, and geographical locations of a plurality of physical stores;

a recommendation engine in said computing device configured to:

apply an exponential time complexity to the one or more products and/or services and, a pseudo-polynomial time complexity to the one or more user-defined parameters;

compute a similarity score of said user for each of said one or more products and/or services using:

$$S^u_{r_k, \pi_i} = \left\{ \sum_{j=1}^{4} w_{j,p} * \frac{1}{1 + |C_{j,m} - f_j|^2} \right\}$$

where:
u represents the user, with user persona p, who transmitted the request, $\pi_i$ represents a product and/or service among the one or more products and/or services specified by the user in the request, $r_k$ represents the physical store in which the matched product and/or service m corresponding to the product and/or service $\pi_i$ is available, $w_{j,p}$ represents the weights of the user u for the one or more feature categories, and $S^u_{r_k, \pi_i}$ represents the similarity score of the user for the product and/or service $\pi_i$ with the corresponding matched product and/or service m, $C_{j,m}$ represents feature values associated with a matched product and/or service m, and f<sub>j</sub> represents feature value for one or more products and/or services specified by the user;

generate a recommendation list based on said aggregated information and said similarity score of said user for each of said one or more products and/or services, wherein at least one recommendation in said generated recommendation list comprises a set of products and/or services from said one or more products and/or services, a route encompassing a set of physical stores from said plurality of physical stores associated with said set of products and/or services; and said one or more transceivers in said computing device configured to:

transmit said generated recommendation list to said user-computing device, wherein a recommendation is selected from said recommendation list by said user for purchasing and/or availing products and/or services based on said selected recommendation.

12. The system of claim 11, wherein said one or more user-defined parameters comprise at least a time constraint, a budget constraint, a first geographical location of said user and a second geographical location of said user.

13. The system of claim 11, wherein said profile information of said user comprises at least a purchase history for a plurality of products and/or services, demographic details, and lifestyle information of said user.

14. The system of claim 11, wherein said data processor in said computing device is further configured to compute said similarity score of said user for a product and/or service in said one or more products and/or services based on said profile information.

15. The system of claim 14, wherein said similarity score is further computed, based on one or more feature values associated with said product and/or service for said one or more feature categories.

16. The system of claim 14, wherein said recommendation engine in said computing device is further configured to rank recommendations in said recommendation list based on a first criteria and/or a second criteria.

17. The system of claim 16, wherein said first criteria corresponds to a count of products and/or services in said set of products and/or services associated with each recommendation in said recommendation list, wherein said second criteria corresponds to said similarity score associated with each said product and/or service in said set of products and/or services.

18. The system of claim 11, wherein said recommendation engine in said computing device are further configured to update said recommendation list based on said selection of said recommendation by said user, wherein said selection corresponds to a feedback received from said user.

19. The system of claim 11, wherein said recommendation in said recommendation list further comprises a cost of each of said set of products and/or services and a current offer on said set of products and/or services.

20. A computer program product for use with a computer, said computer program product comprising a non-transitory computer readable medium, wherein said non-transitory computer readable medium stores a computer program code for data processing to recommend a list of physical stores in real-time for user-specified products and/or services, wherein said computer program code is executable by one or more processors in a computing device to:
receive a request from a user-computing device associated with a user, over a communication network, wherein said request comprises one or more products and/or services and one or more user-defined parameters;
aggregate information associated with said received request, profile information of said user, real-time traffic information, and geographical locations of a plurality of physical stores;
apply an exponential time complexity to the one or more products and/or services and, a pseudo-polynomial time complexity to the one or more user-defined parameters;
determining a similarity score of said user for each of said one or more products and/or services using:

$$S_{r_k,\pi_i}^u = \left\{ \sum_{j=1}^{4} w_{j,p} * \frac{1}{1+|C_{j,m}-f_j|^2} \right\}$$

where:
u represents the user, with user persona p, who transmitted the request,
$\pi_i$ represents a product and/or service among the one or more products and/or services specified by the user in the request,
$r_k$ represents the physical store in which the matched product and/or service m corresponding to the product and/or service $\pi_i$ is available,
$w_{j,p}$ represents the weights of the user u for the one or more feature categories,
$S_{r_k,\pi_i}^u$ represents the similarity score of the user for the product and/or service $\pi_i$ with the corresponding matched product and/or service m,
$C_{j,m}$ represents feature values associated with a matched product and/or service m, and
$f_j$ represents feature value for one or more products and/or services specified by the user;
generate a recommendation list based on said aggregated information and said similarity score of said user for each of said one or more products and/or services, wherein at least one recommendation in said generated recommendation list comprises a set of products and/or services from said one or more products and/or services, a route encompassing a set of physical stores from said plurality of physical stores associated with said set of products and/or services; and
transmit said generated recommendation list to said user-computing device, wherein a recommendation is selected from said recommendation list by said user for purchasing and/or availing products and/or services based on said selected recommendation.

* * * * *